(No Model.)

H. C. RICE.
COFFEE POT.

No. 299,582. Patented June 3, 1884.

WITNESSES:
E. B. Bolton
Geo. Bainton

INVENTOR:
Henry C. Rice
By his Attorneys,
Burke, Fraser & Kowua

UNITED STATES PATENT OFFICE.

HENRY C. RICE, OF LOUISIANA, MISSOURI.

COFFEE-POT.

SPECIFICATION forming part of Letters Patent No. 299,582, dated June 3, 1884.

Application filed October 27, 1883. (No model.)

*To all whom it may concern:*

Be it known that I, HENRY C. RICE, a citizen of the United States, and a resident of Louisiana, Pike county, Missouri, have invented certain Improvements in Coffee Pots and Filters, of which the following is a specification.

My invention relates to an improved coffee pot and filter wherein the pot is provided with a frusto-conical cylinder attached to its top to form a mouth-piece, and adapted to receive the filter, which consists of a frusto-conical cylinder adapted to fit into the mouth of the pot. The filtering fabric—which may be muslin, for example—is clamped between the two conic frusta and covers the bottom of the inserted filter.

Figure 1:
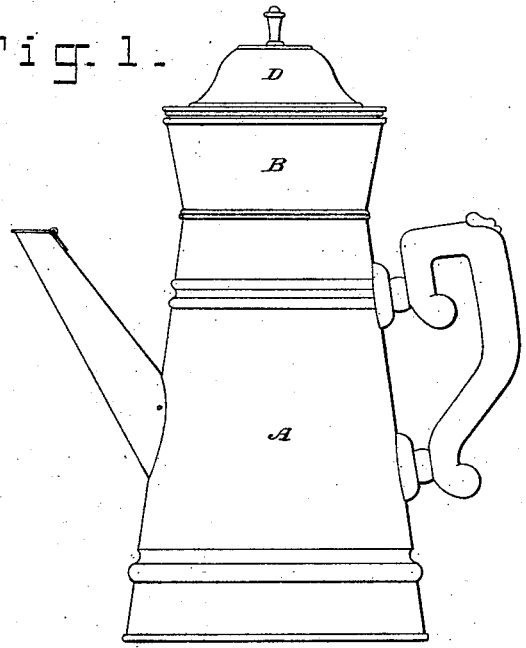
Figure 2:
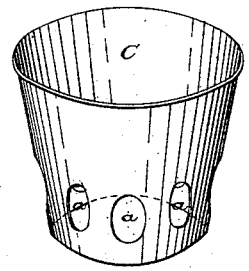
Figure 3:
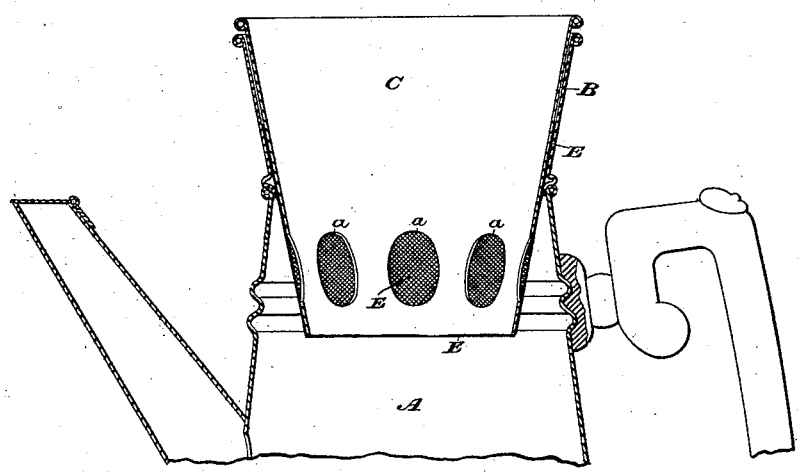
Figure 4:
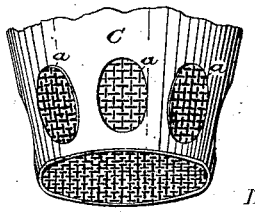

In the drawings which serve to illustrate my invention, Figure 1 is a side elevation of a coffee-pot provided with my improvements. Fig. 2 is a perspective view of a conical filter removed. Fig. 3 is an enlarged sectional view showing the filter in place in the pot. Fig. 4 illustrates a modification of the filter.

I have shown my improvements as applied to an ordinary coffee-pot; but they may be equally well applied to an urn or coffee-holder of any size or shape.

Let A represent the body of the pot. To the top of the said pot is secured in any convenient way a frusto-conical mouth-piece, B, the lower smaller end of which conforms substantially in size and shape to the mouth of the body of the pot. C is what I denominate the "filter." This consists of a frusto-conical cylinder, open at both ends, and provided with lateral openings $a\ a$ near its smaller end. The filter is made to fit into the mouth-piece B, and, when in place, to project down into the cavity of the pot somewhat, as shown in Fig. 3. In order to impart a finished appearance to the pot and to hide the edge of the filtering-cloth, I prefer to construct the filter C to enter the cylinder B far enough for the beaded upper edges of the two to come nearly together; and I also prefer to so construct the parts B and C that the same cover, D, will fit both, so that when the filter is removed the cover may be employed for the pot.

I will now describe the mode of using my pot and filter, referring particularly to Fig. 3 for illustration.

The filtering-cloth E, which may be a disk or piece of unbleached muslin, is placed over the lesser open end of the filter C, and the latter, bearing the cloth, thrust down into the pot through B. The cloth will thus be drawn smoothly over the small end of the filter, and will cover the lateral openings $a\ a$ in its lower extremity, and the edges of the cloth will be closely confined between the parallel walls of B and C. The ground or pulverized coffee is now placed in the filter C and hot water poured in and allowed to percolate through in the usual way.

Although I have described the parts B and C as cylindrical or circular in plan, and prefer to make them of this form, still they might be square, polygonal, or of other forms as well. They should, however, have like forms, so as to fit each other properly. The mouth-piece B of the pot might also be made detachable therefrom, if desired, to facilitate cleaning the pot and removing the grounds.

In lieu of leaving the bottom of the filter C and the apertures $a\ a$ open, I may cover them with fine wire-gauze, as shown in Fig. 4.

It will be observed that the flared conical shape of the filter and mouth-piece causes the former to fit the latter tightly when inserted. The filter is thus supported and held steady in its position. It does not hang by its bead.

I do not claim the apertures $a\ a$ in the sides of the filter C, as these were shown in my patent of a filter, No. 257,516; nor do I limit myself to the use of these apertures in the filter.

I am aware that it has been proposed to provide a coffee-pot with a shallow conical mouth, to insert in this a conical cup, B, with a strainer in its lower end, and to insert in this cup a conical reservoir for water, having a perforated bottom; but in this the strainer, made up of textile fabric or metal, or both, is a structure of itself, and is supported on inner projecting flanges on the cup. I employ only a simple cloth of any kind for a strainer, and this is simply drawn over the open or foraminous end of the conical filter C, and the latter thrust into the conical mouth-piece B, where it is held as in a clamp. This fabric may be renewed at pleasure by the user with little or no expense or trouble.

Having thus described my invention, I claim—

1. The combination, with the coffee pot or vessel having a conical mouth-piece, B, of the conical filter C, adapted to fit snugly into the said mouth-piece, and the filtering-cloth E, the said cloth being arranged to cover the lower end of the filter and to be clamped between the filter and the mouth-piece, as set forth.

2. The combination of the pot or vessel A, provided with a conical mouth-piece, B, secured to it as set forth, the conical filter C, constructed to fit snugly into said mouth-piece, and the filtering fabric clamped between the filter and the mouth-piece, the said filter being arranged to project through the mouth-piece into the pot, substantially as set forth.

In witness whereof I have hereunto signed my name in the presence of two subscribing witnesses.

HENRY C. RICE.

Witnesses:
 HENRY CONNETT,
 GEO. BAINTON.